United States Patent
Næss-Schmidt

(10) Patent No.: US 10,874,112 B2
(45) Date of Patent: Dec. 29, 2020

(54) FREEZING INSTALLATION

(71) Applicant: Carsoe A/S, Aalborg Ø (DK)

(72) Inventor: Steffen Næss-Schmidt, Vodskov (DK)

(73) Assignee: Carsoe A/S, Aalborg Ø (DK)

( * ) Notice: Subject to any disclaimer, the term of this patent is extended or adjusted under 35 U.S.C. 154(b) by 85 days.

(21) Appl. No.: 16/055,940

(22) Filed: Aug. 6, 2018

(65) Prior Publication Data

US 2019/0045802 A1 Feb. 14, 2019

(30) Foreign Application Priority Data

Aug. 9, 2017 (DK) .................................. 2017 70610

(51) Int. Cl.
*F25D 13/02* (2006.01)
*F25D 25/04* (2006.01)
(Continued)

(52) U.S. Cl.
CPC .............. *A23B 4/064* (2013.01); *F25D 13/02* (2013.01); *F25D 25/021* (2013.01);
(Continued)

(58) Field of Classification Search
CPC ...... F25D 31/001; F25D 13/02; F25D 25/021; F25D 25/04; B29C 2045/4241;
(Continued)

(56) References Cited

U.S. PATENT DOCUMENTS 2,235,209 A * 3/1941 Fletcher, Jr. ......... B65D 77/003
426/393
2,254,406 A 9/1941 Zarotschenzeff
(Continued)

FOREIGN PATENT DOCUMENTS

CA 895706 A 3/1972
GB 1201807 A 8/1970
(Continued)

OTHER PUBLICATIONS

European Search Report for European Application EP18183340, dated Dec. 18, 2018.
(Continued)

*Primary Examiner* — Frantz F Jules
*Assistant Examiner* — Erik Medoza-Wilkenfel
(74) *Attorney, Agent, or Firm* — Quinn IP Law

(57) ABSTRACT

A freezing installation for freezing food articles in blocks, particularly seafood, said freezing installation comprising a pre-pressing apparatus and one or more horizontal plate freezers, said horizontal plate freezer having one or more horizontal freezing plates:

means for introducing trays into the pre-pressing apparatus;

the pre-pressing apparatus comprises a plurality of horizontal shelves onto which in use the trays are placed, and a top plate, said shelves and top plate are stacked on top of each other;

means for transferring the trays from the shelves of the pre-pressing apparatus to the horizontal freezing plates of the one or more horizontal plate freezers;

one or more plate freezers, each having a plurality of freezing plates stacked on top of each other means for emptying the plate freezer, and transferring the tray for further processing.

12 Claims, 3 Drawing Sheets

(51) Int. Cl.
  *A23P 10/10* (2016.01)
  *A23B 4/06* (2006.01)
  *F25D 31/00* (2006.01)
  *F25D 25/02* (2006.01)

(52) U.S. Cl.
  CPC ......... *F25D 25/028* (2013.01); *F25D 31/001* (2013.01); *A23V 2002/00* (2013.01)

(58) Field of Classification Search
  CPC ............. B29C 2045/4266; A23P 10/10; B32B 2439/70; B64D 2013/0629; A23B 4/06; F17C 2227/0381; F17C 2227/0353
  See application file for complete search history.

(56) References Cited

U.S. PATENT DOCUMENTS

| | | | | |
|---|---|---|---|---|
| 2,359,379 A | * | 10/1944 | Ophuls | ................ F25D 13/067 206/561 |
| 2,484,944 A | | 10/1949 | Hall | |
| 2,910,837 A | | 7/1956 | Patterson | |
| 3,602,422 A | * | 8/1971 | Dewhurst | .............. B65D 5/563 426/124 |
| 2008/0213080 A1 | * | 9/2008 | Cachelin | ................ B65G 1/127 414/791.6 |

FOREIGN PATENT DOCUMENTS

| | | |
|---|---|---|
| GB | 1205608 A | 9/1970 |
| JP | H0198467 A | 4/1989 |
| JP | H03130035 A | 6/1991 |
| JP | 2004129627 A | 4/2004 |

OTHER PUBLICATIONS

Takada T., "The Trend Toward Greater Rationalization in Horizontal Contact Plate Freezers", Reito—Refrigeration, Nippon Reito, Kyokai, Tokyo, JP, vol. 63, No. 729, Jul. 1, 1988, pp. 729-733, xp001159628, ISSN: 0034-3714.

* cited by examiner

FREEZING INSTALLATION

CROSS-REFERENCE TO RELATED APPLICATION

This application claims priority, and the benefit of, Danish Application Number PA 2017 70610, filed on Aug. 9, 2017, entitled "Freezing Installation," the entire disclosure of which is incorporated herein by reference.

FIELD OF THE INVENTION

The present invention relates to a freezing installation for freezing food articles in blocks, particularly seafood, as well as a method for freezing food articles in blocks using a freezing installation according to the invention.

BACKGROUND OF THE INVENTION

In the art horizontal plate freezers are fairly widespread and used for a multitude of purposes, particularly in the fishing industry for onboard freezing, horizontal plate freezers are widely used.

The fresh fish is arranged in trays which trays are thereafter placed on shelves of the horizontal plate freezer. After being frozen the trays are removed and emptied such that the now stiff, frozen blocks of fish may be further processed in cardboard packages or processed to fish portions or the like.

Common for these type of horizontal plate freezers is the fact that the horizontal plate freezer comprises a number of horizontally arranged freezing plates which by various arrangements of actuating means may be elevated or lowered in a vertical direction relative to each other.

In this manner it is possible to open the freezer or at least open the space between two freezing plates in order to gain access to the space between the freezing plates. The freezing action is accomplished by the freezing plates having contact with the object it is supposed to freeze, for example fish.

In order to create this contact the freezing plates are moved towards each other (usually all freezing plates are moved downwards) such that the object to be frozen is in physical contact with the freezing plate. At this point a freezing medium is circulated in the freezing plates for a certain period of time until the object to be frozen is frozen solid or at least the temperature inside the object is at a desired low level.

At this time the actuating means are activated again opening the horizontal plate freezer by forcing the freezing plates apart thereby allowing the blocks on the freezing plates to be moved, usually removed, from the freezing plate for storage or further treatment.

One general consideration when treating foodstuff is the hygiene and the ability to maintain a clean and hygienically safe environment. In this connection it is undesirable to have to clean all the freezing plates between each freezing cycle. A freezing cycle is defined as the time when the freezer is open and non-frozen trays are positioned on the shelves; the freezer is closed, i.e. the freezing plates are moved into contact with the trays positioned on the shelves; the freezing medium is circulated in the freezing plates until the desired temperature is reached after which the freezing plates are moved vertically in order to come out of contact with the trays containing the frozen food articles. At this time the frozen trays are removed from the freezing plates and the freezer is ready to receive new, unfrozen trays filled with food articles to be frozen. This is the understanding of a freezing cycle also within the present invention.

The hygienic considerations are naturally paramount in that food safety is of great concern. One disadvantage with using horizontal plate freezers is the fact that the food articles to be frozen are positioned in trays and when the freezing plates are moved towards each other in order to commence the freezing cycle the freezing plates come into contact with the food articles to be frozen.

Usually the food articles, particularly when the food articles are seafood, are usually placed in the trays manually. In order to achieve a substantially homogenous block of frozen food article, it is undesirable to have air and too much water in the block and therefore when positioning the seafood in the trays the seafood will typically be piled a little higher at some points than the size of the tray. As the food article (seafood) comes into contact with the freezing plates the freezing plates will squeeze the food articles into the trays thereby evening out the level of the food articles such that they will more or less be flush with the topside of the trays and at the same time be in substantially full contact with the freezing plate.

However, during this process excess water and juice from the food articles may be squeezed out of the tray and arrive at the top surface of the freezing plate. This provides at least two disadvantages.

Firstly, as the horizontal freezing plates are horizontal, the liquid (water and juice from the food articles) will remain on the horizontal freezing plate during the freezing cycle and thereby freeze in the same manner as the food articles in the trays. During this process the trays will be frozen solidly and connected to the freezing plate such that as the freezing cycle is terminated and it is desirable to remove the trays from the horizontal freezing plate, this is a cumbersome process, in that the liquid—now ice, has to be broken in order to be able to remove the trays.

A second disadvantage is the fact that between freezing cycles the frozen liquid may thaw and thereby be pushed out of the freezing installation and end up on the floor or on the sides of the freezing installation. This is a rather unhygienic condition and it is therefore necessary to thoroughly clean the freezing installation and its surroundings relatively often in order to maintain the high hygienic standard required when handling or treating foodstuffs.

OBJECT OF THE INVENTION

Consequently, it is the object of the present invention to address these disadvantages and provide further advantages as will be evident from the description below.

DESCRIPTION OF THE INVENTION

The invention addresses this object by providing a freezing installation for freezing food articles in blocks, particularly seafood, where the food articles prior to being introduced into the freezing installation is arranged in trays, said freezing installation comprising a pre-pressing apparatus and one or more horizontal plate freezers, said horizontal plate freezer having one or more horizontal freezing plates, the freezing installation further comprising:

- means for introducing trays into the pre-pressing apparatus
- the pre-pressing apparatus comprises a plurality of horizontal shelves onto which in use the trays are placed, and a top plate, said shelves and top plate are stacked on top of each other, where each horizontal shelf and the top plate are connected to at least one actuator such that each shelf and top plate is able to be moved vertically, and the at least one actuator can provide a downwards force in use urging the horizontal shelves and the top plate into contact with the trays positioned on the shelves;

means for transferring the trays from the shelves of the pre-pressing apparatus to the horizontal freezing plates of the one or more horizontal plate freezers;

one or more plate freezers, each having a plurality of freezing plates stacked on top of each other means for emptying the plate freezer, and transferring the tray for further processing.

Particularly the provision of a pre-pressing apparatus which initially squeezes the filled trays before the trays are transferred to the horizontal plate freezer provides great advantages. Possibly, the pre-pressing apparatus also constitutes a pre-freezing apparatus for also freezing the food when being squeezed. Thereby, the food when being squeezed during pre-pressing, maintains in a better manner a shape of as example blocks, which the food is provided during pre-pressing and before further freezing. As already mentioned above, the trays will typically be filled manually with a measured amount of food articles. In the onboard freezing installations typically used the trays are designed to hold approximately 7.5 kilos of fresh fish, but due to the uneven distribution of fish and the uneven size of fish the manually created level in the tray will typically be such that there is a slight bulge upwards from the topsides of the trays.

By introducing the trays into the pre-pressing apparatus which effectively squeezes the food articles, particularly fish, into the tray, any surplus material, such as liquid, water and air, will be forced out of the tray whereby a more evenly and homogenously filled tray will be the result.

Furthermore, as the pre-pressing apparatus does not freeze the foodstuff, the surplus liquid will remain liquid and thereby easily be drained off to appropriate drainage means provided in connection with the pre-pressing apparatus.

Once the trays have been exposed to the squeezing in the pre-pressing apparatus the measured trays now having a content within the limitations of the trays may be transferred to the horizontal freezing apparatus and be placed on the horizontal freezing plates without contaminating and polluting the horizontal freezer as such.

This fact alleviates a lot of the cleaning necessary with prior art horizontal freezers and furthermore ensures that a higher standard of hygiene may be achieved throughout the handling process through the freezing installation.

In a further advantageous embodiment of the invention the pre-pressing apparatus and the one or more plate freezers are arranged in an array, where the means for introducing trays into the pre-pressing apparatus comprises a first conveyor belt arranged along one side of the array, where a first robot is situated to collect trays transported on said first conveyor belt and insert the trays on designated shelves in the pre-pressing apparatus, where said first robot has gripping claws arranged to grip and remove the trays from the conveyor belt, and place said trays in an elevator, where the elevator elevates the tray to the level of the desired shelf, at which point a pushing ram, pushes the tray from the elevator onto the desired shelf.

In this manner the filling of the pre-pressing apparatus may be carried out completely automatically, and particularly due to the use of trays which are completely uniform it is possible for the robot to be relatively simple and at the same time very reliable.

In a still further advantageous embodiment of the invention the pre-pressing apparatus and the one or more plate freezers are arranged in an array, where the means for transferring the trays from the shelves of the pre-pressing apparatus to the horizontal freezing plates of the one or more horizontal plate freezers comprises means for retrieving trays from the pre-pressing apparatus said means comprises a second conveyor belt arranged along one side of the array or alternatively the first conveyor may be used, where a second robot is situated to collect trays pushed out by the pushing ram of the first robot, where said second robot has gripping claws arranged to grip the pushed out trays and by means of a second elevator place the trays on the second conveyor belt, or alternatively first conveyor belt.

By arranging a second robot in order to retrieve the trays from the pre-pressing apparatus and transferring them to the horizontal plate freezers also this part of the procedure is automated. It is foreseen that the pre-pressing apparatus may be filled manually such that the first robot is not necessary in order to achieve the advantages of the present invention, and for the same reason the second robot may also be avoided when manual labour can carry out the transfer of trays from the pre-pressing apparatus to the horizontal plate freezer. However, it is very rational to use robots as both the first robot and the second robot may be relatively simple constructions handling standard objects (the trays).

Furthermore, particularly when these types of freezing installations are arranged on board ships, the robots save space and at the same time are very reliable. For this purpose, due to the space saving and the saving of manual labour it is very desirable to provide robots to fill and empty the pre-pressing apparatus and to fill and empty the plate freezers as such.

In a further advantageous embodiment a third robot is provided in order to empty the plate freezer where the third robot is provided to collect and introduce trays from the first or second conveyor belts and introduce said trays into the plate freezer, where said third robot has gripping claws arranged to grip and remove the trays from the first or second conveyor belt, and place said trays in a third elevator, where the elevator elevates the tray to the level of the desired freezing plate, at which point a pushing ram, pushes the tray from the elevator onto the desired freezing plate.

Consequently, by introducing a still further fourth robot, as provided in a still further advantageous embodiment where the means for retrieving trays from the horizontal plate freezer comprises a fourth robot situated to collect trays pushed out by the pushing ram of the third robot, where said fourth robot has gripping claws arranged to grip the pushed out trays and by means of a fourth elevator place the trays on the third conveyor belt or alternatively the first or second conveyor belts.

The entire process is therefore automated as long as the filled trays are introduced onto the first conveyor where they may be collected and introduced into the prefreezing apparatus.

With this automated process it is advantageous that each freezing plate can accommodate the same number of trays as each shelf in the pre-pressing apparatus. This simplifies the work of the robots as they will recognize that the same number of trays shall be introduced on any level of both the pre-pressing apparatus and the horizontal freezing plates of the horizontal plate freezers.

In a still further advantageous embodiment of the invention the pre-pressing apparatus is provided with a vibration or shaking generator, such that each shelf may be agitated. By introducing vibrators or means to shake the shelves of the pre-pressing apparatus any air bubbles and liquid trapped in the trays may easily be brought to the surface and thereby expelled from the trays providing a more homogenous content in the trays.

This in addition to retaining the spillage from the trays in the pre-pressing apparatus also provides a more homogenous and faster freezing process.

The use of the freezing installation according to the present invention is described in a method for freezing food articles and blocks according to a still further advantageous embodiment of the invention where the food articles is particularly seafood, and where the food articles prior to being introduced into the freezing installation are arranged in trays, where the freezing installation comprises a pre-pressing apparatus and one or more horizontal plate freezers, where said pre-pressing apparatus comprises a plurality of horizontal shelves arranged vertically on top of each other and uppermost provided with a top plate, and where means are provided for moving the horizontal shelves and the top plate vertically, and where, when all shelves are filled with trays, the horizontal shelves and the top plate are urged downwards, thereby coming into contact with the trays and squeezing the food articles into the trays, and that after a first predetermined time period the shelves and the top plate are moved vertically upwards, such that the trays can be removed from the pre-pressing apparatus and transferred to one of the one or more horizontal plate freezers, where, after the plate freezer is filled with trays the plate freezer is closed and a freezing cycle for a second predetermined time period is completed, after which the trays are removed from the plate freezer, the trays are emptied and the now frozen blocks of food articles are conveyed for further processing.

The advantages already described above with respect to the description of the freezing installation according to the present invention are also achieved with the method, but particularly one embodiment of the invention is especially advantageous in that when the array of apparatuses in the freezing installation comprises one pre-pressing apparatus and five horizontal freezers a very rational and substantially continuous freezing cycle may be obtained.

Typically, as set out in a further advantageous embodiment the predetermined time periods relating to the first predetermined time period are between 10 and 20 minutes, more preferred 15 minutes, and the second pre-determined time period is from 100 to 180 minutes, more preferred from 120 to 150 minutes, and most preferred 140 minutes.

Using these cycle times and having one pre-pressing unit and five horizontal plate freezers where the pre-pressing apparatus and the horizontal plate freezers can accommodate the same number of trays, a substantially continuous method of freezing food articles in blocks is attained using a freezing installation according to the present invention.

DESCRIPTION OF THE DRAWING

The invention has now been described in more general terms and one particular embodiment will now be described with reference to the accompanying drawing wherein.

DETAILED DESCRIPTION OF THE INVENTION

Figure 1:
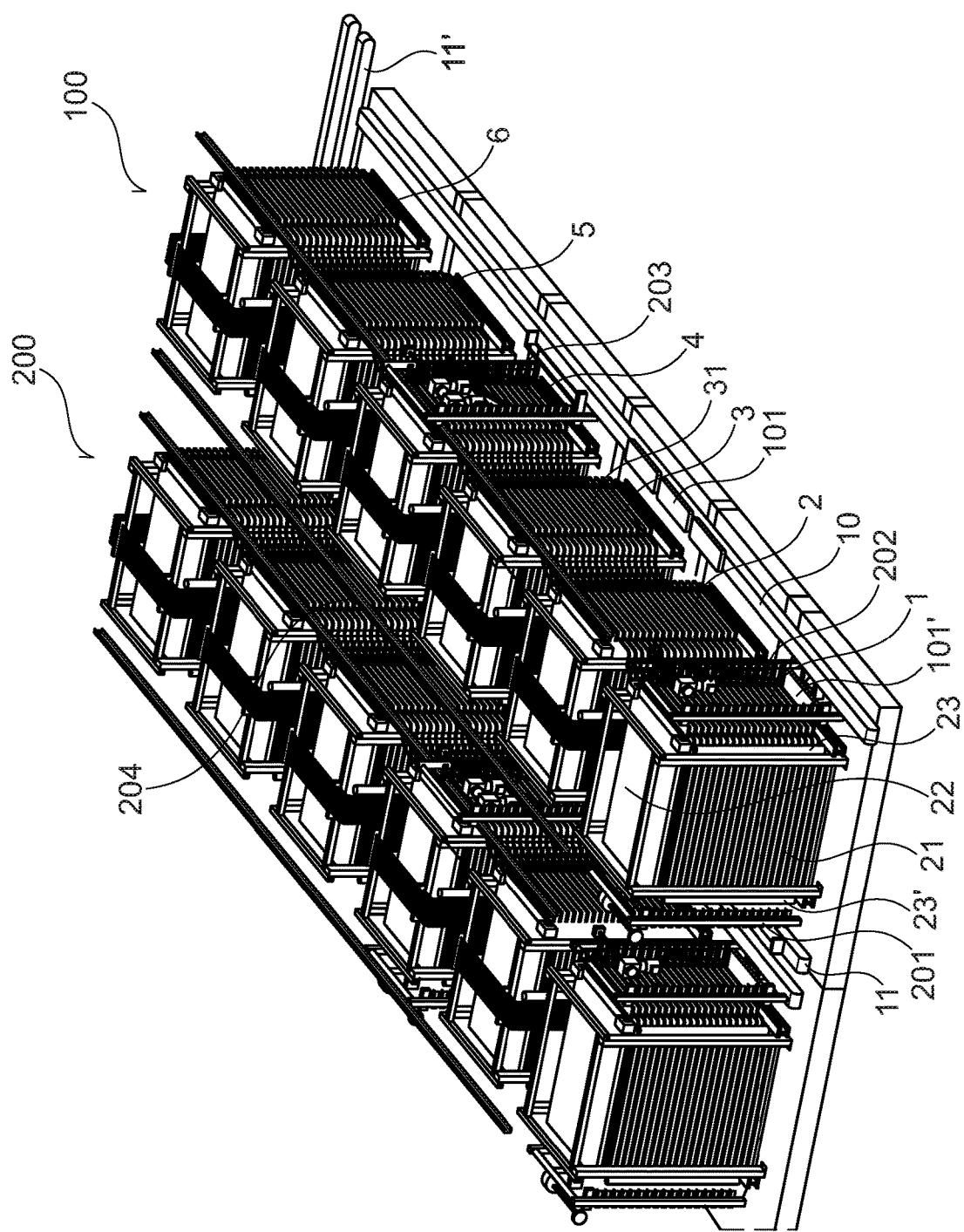
FIG. 1 illustrates an overview of a freezing installation

In FIG. 1 is illustrated an overview of a freezing installation according to the present invention. The freezing installation comprises a pre-pressing apparatus 1 and in this particular embodiment five plate freezers 2-6. The pre-pressing apparatus may also constitute a pre-freezing apparatus for pre-freezing food during pre-pressing the food into blocks.

The pre-pressing apparatus 1 and the five plate freezers 2-6 are arranged in an array such that conveyor belts 10, 11 can be arranged along one side of the array of pre-pressing apparatus and plate freezers.

In FIG. 1 two arrays 100, 200 are illustrated, each array comprising a pre-pressing apparatus 1 and five plate freezers 2-6.

The pre-pressing apparatus 1 comprises a plurality of horizontal shelves 21 and a top plate 22. By means of actuators 23, 23' (further two actuators behind the pre-pressing apparatus 1 are hidden behind the pre-pressing apparatus). By activating the actuators 23, 23' as well as the hidden actuators the top plate 22 and the shelves 21 are moved vertically thereby increasing the distance between the shelves and as such making room for the object to be frozen.

Freezing installations 100, 200 as illustrated with reference to FIG. 1 are typically used with trays 101 of which a few are illustrated in the figure. The trays all have a standard size and particularly a standard height such that as a plurality of trays are accommodated on each shelf 21 of the pre-pressing apparatus and the freezing plates 31 of the plate freezers 2-6 it is possible to move the shelves and the freezing plates 31 respectively in a vertical direction such that the freezing plates and shelves 21 come into an even contact with the upper and lower limitations of the trays 101.

Particularly for the plate freezers this is important in order to establish a thermal contact such that the freezing medium being circulated in the freezing plates may absorb energy from the foodstuff placed in the trays and thereby freeze the products to be frozen in the trays 101.

In order to introduce trays into the pre-pressing apparatus a first robot 201 is provided. The robot collects trays from the conveyor belt 11 and inserts the trays in determined positions, i.e. at pre-determined levels on shelves 21 in the pre-pressing apparatus 1. When the pre-pressing apparatus 1 is filled with trays the actuators 23, 23' are activated thereby squeezing the top plate and the shelves downwards into contact with the trays positioned on the shelves 21. After a pre-determined time period, typically up to 15 minutes, the pressures is released by reactivating the actuators thereby moving the top plate 22 and the shelves 21 vertically upwards. The 15 minutes is sufficient time to allow air, gas, liquid and other matter to percolate to the surface of the tray, and be expelled from the tray.

At this time, i.e. after the pressing of the trays, the first robot 201 will start to collect new trays to be squeezed in the pre-pressing apparatus and insert these at appropriate shelves in the apparatus. As the apparatus 1 is completely filled with trays which have just been squeezed, the insertion of new trays by the robot 201 will cause squeezed trays 101' to be pushed out of the shelves 21 of the pre-pressing apparatus 1.

In order to collect these trays 101' which are pushed out of the pre-pressing apparatus 1 a second robot 202 is provided. The robot 202 will collect the tray 101' and position the trays on the conveyor 10 which conveyor will transport the tray further down the array into a predetermined position next to a plate freezer 2-6.

The first robot 201 will substantially continuously insert fresh trays to be squeezed in the pre-pressing apparatus 1 such that a continuous stream of pressed trays 101' will be pushed out of the pre-pressing apparatus 1 and collected by the robot 202 and positioned on the conveyor belt 10. For clarity reasons only a limited amount of trays are illustrated in the figure, but it shall be understood that a substantially continuous process of inserting and retrieving trays from the pre-pressing apparatus when the pre-pressing apparatus is open is carried out.

A third robot 203 is positioned downstream from the second robot in order to collect the trays which have been squeezed by the pre-pressing apparatus and positioned onto the conveyor belt 10. The robot 203 collects the trays and inserts the trays at appropriate positions in one of the plate freezers 2-6. The trays which are inserted/pushed into the plate freezer cause trays already positioned on the shelves of the plate freezer to be pushed out on the opposite side where these trays are collected by a fourth robot 204.

In this connection it is assumed that prior to pushing a pressed tray into the plate freezer the plate freezer has completed a freezing cycle and opened the freezing plates by displacing the freezing plates vertically due to the activation of appropriate actuators. At this stage the frozen trays placed on the freezing plates of the plate freezer will be relatively loose and as the robot 203 pushes a freshly squeezed tray onto the freezing plate. This will cause the trays on the freezing plates to move laterally thereby forcing the outermost frozen tray on the opposite side of the robot 203 to arrive in the gripping means of the fourth robot 204 which in the meantime has been positioned appropriately in order to receive a frozen tray.

The robot 204 thereafter positions the frozen tray on the conveyor 11' in order to transport the now frozen food articles in the trays away from the freezing installation 100.

In this manner a substantially complete automated squeezing and freezing operation has been carried out.

Figure 2:
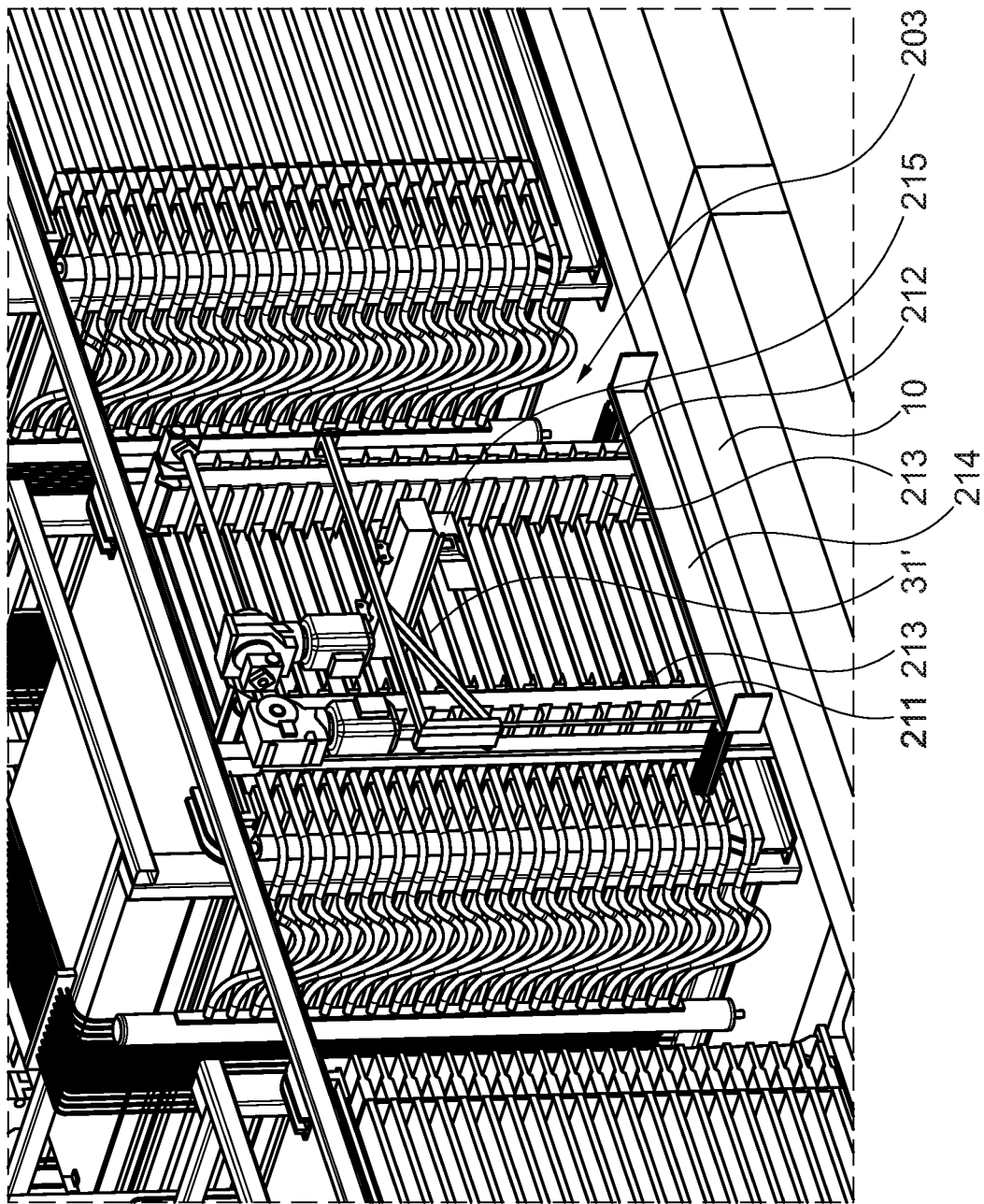
FIG. 2 illustrates the principles of the robot

With reference to FIG. 2 the principles of the robot 201-204 will be explained.

In FIG. 2 is illustrated an example of the robot, for example the third robot. It shall, however, be noticed that the four robots discussed above with reference to FIG. 1 may be identical in that they more or less carry out the same action. Furthermore, in other embodiments it may be advantageous to have robots with different configurations, but for the description of the present invention it is assumed that all robots are alike.

The robot 203 is arranged such that it may travel along the array 100,200 of plate freezers 2-6 and pre-pressing apparatus 1 and along the conveyor belt 10. In this embodiment the robot comprises an elevator in the shape of a paternoster elevator 211, 212. The paternoster elevator comprises a plurality of flanges 213 arranged at a mutual distance allowing a tray to be held by the flanges of the paternoster elevator 211, 212.

In FIG. 1 a tray 101 is held by the flanges 213 of the second robot 202.

As a tray is superposed the robot 203, a gripping arm 214 will engage the tray and force the tray onto the paternoster elevator 211, 212 by accommodating the tray on the flanges 213. At this point the elevator is activated bringing the tray up to a desired level flush with a desired freezing plate, for example freezing plate indicated by 31'.

In this position a pushing ram 215 is positioned such that the pushing ram will engage the tray placed on the flanges 213 and force the tray onto the appropriate freezing plate 31'.

If the freezer 2-6 has just completed a freezing cycle and the freezing plates have been moved vertically in order to take the pressure of the trays, the trays are relatively loose. At this time it is possible for the pushing ram 215 to push a new tray from the flanges 213 onto the freezing plate 31'. At the same time a now frozen tray on the opposite side of the freezer will be pushed out.

This tray which is pushed out will be received by a robot corresponding in construction to the robot illustrated with reference to FIG. 2 such that the tray is received on the flanges 213 of the robot and thereafter lowered to the level of the conveyor belt and by pushing means transferred to the conveyor belt and thereby transported on to further processing.

Figure 3:
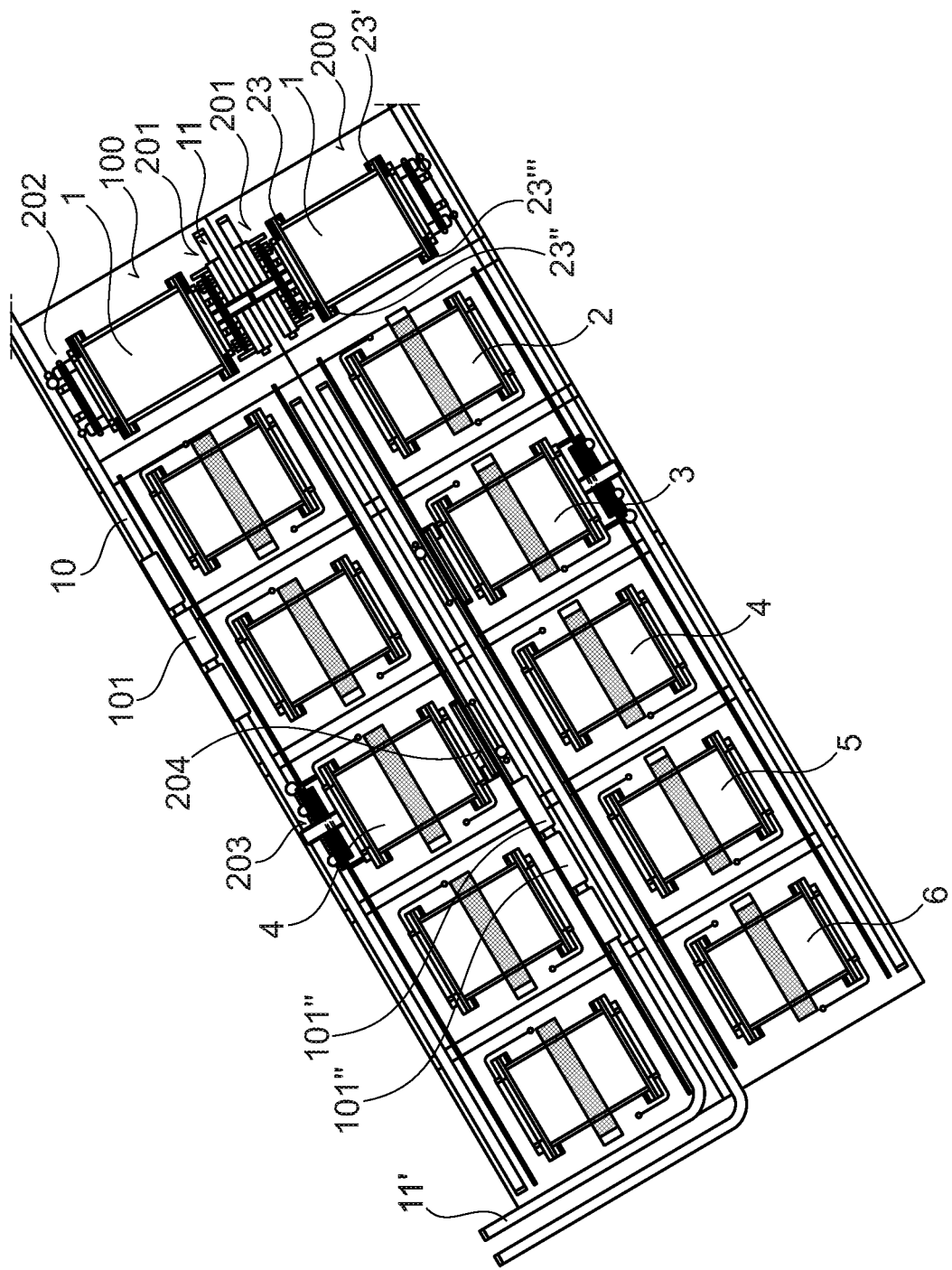
FIG. 3 illustrates an overview of the freezing installation

In FIG. 3 is illustrated an overview of the freezing installation illustrated in a perspective view in FIG. 1. The installation comprises two arrays 100, 200 each array comprises a pre-pressing apparatus 1 and five horizontal plate freezers 2-6.

On the conveyor belt 11 the trays filled with food articles to be frozen are conveyed to the pre-pressing apparatus 1. A first robot 201 collects the trays and elevates and positions the trays at a shelf of the pre-pressing apparatus 1. Once the entire pre-pressing apparatus is filled with trays actuators 23-23''' are activated. The actuators move the shelves such that the shelves come into contact with the upper and lower limitations of the trays. Hereby excess liquid, air, gas and the like will be expelled from the tray. Insertion of another tray in the position occupied by a tray will cause the tray on the shelf to be forced out of the pre-pressing apparatus by the pushing ram 215 on the robot 201.

The robot 202 receives the trays and positions them on the conveyor 10. On the conveyor 10 the trays are transported onto the third robot 203. This robot grips and inserts the trays into one of the plate freezers, in this example plate freezer number 4, thereby ejecting a frozen tray on the opposite side of the plate freezer 4 which frozen tray is collected by the fourth robot 204.

The fourth robot positions the now frozen trays 101" on the conveyor 11" in order to convey the now frozen trays for further processing such as for example emptying the food articles now frozen in a block out of the tray such that the trays may be used again and the frozen block may be sent on to further processing.

The invention claimed is:

1. A freezing installation for freezing food articles in blocks where the food articles prior to being introduced into the freezing installation are arranged in trays, said freezing installation comprising a pre-pressing apparatus and one or more horizontal plate freezers, wherein said one or more horizontal plate freezers having one or more horizontal freezing plates, the freezing installation further comprising:
  means for introducing trays into the pre-pressing apparatus,
  the pre-pressing apparatus comprises a plurality of horizontal shelves onto which in use the trays are placed, and a top plate, said plurality of horizontal shelves and the top plate are stacked on top of each other, where each shelf of the plurality of horizontal shelves and the top plate are connected to at least one actuator such that each shelf of the plurality of horizontal shelves and the top plate is able to be moved vertically, and the at least one actuator is configured to provide a downward force in use urging the plurality of horizontal shelves and the top plate into contact with the trays positioned on the plurality of horizontal shelves;
  means for transferring the trays from the plurality of horizontal shelves of the pre-pressing apparatus, to the horizontal freezing plates of the one or more horizontal plate freezers;

the one or more horizontal plate freezers, each having the one or more horizontal freezing plates stacked on top of each other; and means for emptying the one or more horizontal plate freezers, and transferring the tray for further processing.

2. The freezing apparatus according to claim 1, wherein the pre-pressing apparatus also constitutes a pre-freezing apparatus for pre-freezing the food when being pre-pressed.

3. The freezing installation according to claim 1, wherein the pre-pressing apparatus, and the one or more horizontal plate freezers are arranged in an array, and where the means for introducing the trays into the pre-pressing apparatus, comprises a first conveyor belt arranged along one side of the array, where a first robot is situated to collect trays transported on said first conveyor belt and insert the trays on designated shelves of the plurality of horizontal shelves in the pre-pressing apparatus, where said first robot has gripping claws arranged to grip and remove the trays from the conveyor belt, and place said trays in an elevator, where the elevator elevates a designated tray of the trays to the level of the designated shelf, at which point a pushing ram, pushes the designated tray from the elevator onto the designated shelf.

4. The freezing installation according to claim 1, wherein the pre-pressing apparatus and the one or more plate horizontal freezers are arranged in an array, and where the means for transferring the trays from the the plurality of horizontal shelves of the pre-pressing apparatus to the horizontal freezing plates of the one or more horizontal plate freezers comprises means for retrieving trays from the pre-pressing apparatus, said means for retrieving trays comprises a second conveyor belt arranged along one side of the array or alternatively the first conveyor belt may be used, where a second robot is situated to collect trays pushed out by a pushing ram of the first robot, where said second robot has gripping claws arranged to grip the pushed out trays and on to a second elevator which places the trays on the second conveyor belt, or alternatively first conveyor belt.

5. The freezing installation according to claim 1, wherein a third robot is provided to collect and introduce the trays from the first or second conveyor belts and introduce said trays into the horizontal plate freezer, where said third robot has gripping claws arranged to grip and remove the traysfrom the first or second conveyor belt, and place said trays in a third elevator, where the third elevator elevates the tray to the level of the desired freezing plate, at which point a pushing ram, pushes the trays from the third elevator onto the desired freezing plate.

6. The freezing installation according to claim 5, where means for retrieving trays from the one or more horizontal plate freezer comprises a fourth robot situated to collect the trays pushed out by the pushing ram of the third robot, where said fourth robot has gripping claws arranged to grip the pushed out the trays and by means of a fourth elevator place the trays on the third conveyor belt or alternatively the first or second conveyor belts.

7. The freezing installation according to claim 1, wherein each shelf of the plurality of horizontal shelves in the pre-pressing apparatus and each of the one or more horizontal freezing plates in the one or more horizontal plate freezers can accommodate the same number of trays.

8. The freezing installation according to claim 1, wherein each shelf of the plurality of horizontal shelves in the pre-pressing apparatus is provided with a vibration or shaking generator, such that each shelf of the plurality of horizontal shelves may be agitated.

9. A method of freezing food articles in blocks where the food articles prior to being introduced into the freezing installation are arranged in trays, where the freezing installation comprises a pre-pressing apparatus and one or more horizontal plate freezers, where said pre-pressing apparatus comprises a plurality of horizontal shelves arranged vertically on top of each other and an uppermost shelf of the plurality of horizontal shelves is provided with a top plate, and where means are provided for moving the plurality of horizontal shelves and the top plate vertically, and where, when all shelves are filled with trays, the horizontal shelves and the top plate are urged downwards, thereby coming into contact with the trays and squeezing the food articles into the trays, and that after a first predetermined time period the plurality of horizontal shelves and the top plate are moved vertically upwards, such that the trays can be removed from the pre-pressing apparatus and transferred to one of the one or more horizontal plate freezers, where, after one of the one or more plate freezers is filled with the trays, the one of the one or more plate freezers is closed and a freezing cycle for a second pre-determined time period is completed, after which the trays are removed from the plate freezer, the trays are emptied and the now frozen blocks of food articles are conveyed for further processing.

10. The method according to claim 9, where the pre-pressing apparatus and the one or more horizontal plate freezers are arranged in an array, and when the food articles are seafood, in particular fish, the array comprises one pre-pressing apparatus and five horizontal plate freezers, where an accumulated shelf area of the pre-pressing apparatus is equal to the accumulated horizontal freezing plate area of each of the five horizontal plate freezers.

11. The method according to claim 10, wherein the first predetermined time period is between 10 and 20 minutes, more preferred 15 minutes, and where the second predetermined time period is from 100 to 180 minutes, more preferred from 120 to 150 minutes, and most preferred 140 minutes.

12. The method according to claim 11, wherein the plurality of horizontal shelves of the pre-pressing apparatus are provided with vibrating or shaking means, such that when the trays are filled, each of the trays are placed on a designated shelf of the plurality of horizontal shelves and before an actuator squeezes the shelves together, the shelves having trays are vibrated of shaken to ease the percolation of water, juice, air and/or gas up and away from the food article placed in the trays.

* * * * *